(12) United States Patent
Huang et al.

(10) Patent No.: US 11,863,516 B2
(45) Date of Patent: Jan. 2, 2024

(54) METHOD, APPARATUS AND SYSTEM FOR REALIZING CARRIER GRADE NETWORK ADDRESS TRANSLATION

(71) Applicant: ZTE CORPORATION, Guangdong (CN)

(72) Inventors: Guangping Huang, Guangdong (CN); Yong Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/914,424

(22) PCT Filed: Dec. 28, 2020

(86) PCT No.: PCT/CN2020/140280
§ 371 (c)(1),
(2) Date: Sep. 26, 2022

(87) PCT Pub. No.: WO2021/190029
PCT Pub. Date: Sep. 30, 2021

(65) Prior Publication Data
US 2023/0130514 A1 Apr. 27, 2023

(30) Foreign Application Priority Data
Mar. 24, 2020 (CN) .......................... 202010216614.9

(51) Int. Cl.
*H04L 61/5061* (2022.01)
*H04L 61/2514* (2022.01)

(52) U.S. Cl.
CPC .............................. *H04L 61/2514* (2013.01)

(58) Field of Classification Search
CPC ............ H04L 61/2514; H04L 61/5007; H04L 61/5061; H04L 2101/668; H04L 61/251
See application file for complete search history.

(56) References Cited

U.S. PATENT DOCUMENTS 9,258,272 B1 * 2/2016 Durand .................. H04L 63/30
10,469,446 B1 * 11/2019 Chigurupati ........ H04L 63/0892
(Continued)

FOREIGN PATENT DOCUMENTS

CN 102957754 A 3/2013
CN 104040966 A 9/2014
(Continued)

OTHER PUBLICATIONS

WIPO, International Search Report dated Feb. 19, 2021.
(Continued)

*Primary Examiner* — Aftab N. Khan
(74) *Attorney, Agent, or Firm* — Li & Cai Intellectual Property (USA) Office

(57) ABSTRACT

Provided are a method, an apparatus and a system for implementing carrier grade network address translation, an electronic device, and a computer-readable storage medium. The method includes: transmitting a first request to a control plane of a forwarding and control separated broadband access system, where the first request is used for applying to the control plane for a public network address range; receiving a first response returned by the control plane, where the first response includes allocated public network address range information; receiving a public network address allocated to a user by the control plane according to the public network address range information; receiving a private network address allocated to the user by the control plane; and performing, according to the public network address and the private network address, public and private network address translation on received service traffic of the user.

16 Claims, 7 Drawing Sheets

(56) References Cited

U.S. PATENT DOCUMENTS

| | | | | |
|---|---|---|---|---|
| 10,771,356 B2* | 9/2020 | Lin | ................... | H04L 63/0263 |
| 10,999,242 B1* | 5/2021 | K | ..................... | H04L 61/2517 |
| 11,159,344 B1* | 10/2021 | Shevade | ............. | G06F 9/5077 |
| 2013/0301522 A1* | 11/2013 | Krishna | ............. | H04L 61/2517 |
| | | | | 370/328 |
| 2016/0072766 A1* | 3/2016 | Jain | ..................... | H04L 67/141 |
| | | | | 709/228 |
| 2017/0195256 A1* | 7/2017 | Javali | ................ | H04L 61/4511 |
| 2020/0162422 A1* | 5/2020 | Meng | ................. | H04L 61/2521 |
| 2022/0200952 A1* | 6/2022 | Vinayakumar | ..... | H04L 61/5007 |

FOREIGN PATENT DOCUMENTS

| | | |
|---|---|---|
| CN | 104219334 A | 12/2014 |
| CN | 107079060 A | 8/2017 |
| CN | 107682226 A | 2/2018 |
| CN | 107896182 A | 4/2018 |
| CN | 108259632 A | 7/2018 |

OTHER PUBLICATIONS

China Patent Office, First office action dated Jul. 31, 2023, for corresponding CN application No. 202010216614.9.

Qiyu, "Application Study of vBRAS Based on Forwarding and Control Separation", Feb. 25, 2018, telecommunication technology, www.tttm.com.cn.

Yongming Yan, et al., "NAT444 solution to the dial-up address", Nov. 20, 2016, telecommunications science, Issue No. 11.

* cited by examiner

METHOD, APPARATUS AND SYSTEM FOR REALIZING CARRIER GRADE NETWORK ADDRESS TRANSLATION

CROSS-REFERENCE TO RELATED APPLICATIONS

The present disclosure is a National Phase Application filed under 35 U.S.C. 371 as a national stage of PCT/CN2020/140280, filed on Dec. 28, 2020, an application claiming the priority to Chinese Patent Application No. CN2010216614.9 filed on Mar. 24, 2020, the entire contents of which are incorporated herein by reference.

TECHNICAL FIELD

Embodiments of the present disclosure relate to the field of communications, and in particular relate to a method, an apparatus and a system for implementing carrier grade network address translation (CGN), an electronic device, and a computer-readable storage medium.

BACKGROUND

The wired broadband access is a basic access service for household broadband, enterprise private lines, wireless fidelity (WiFi), or the like, as well as the second major broadband access service except mobile broadband. With the rapid development of emerging access services such as Internet Protocol Television (IPTV), high-definition videos, and the like, the mode of an integrated forwarding and control plane in the traditional wired broadband access network device is increasingly not suitable for the requirements of cloud network architecture, rapid development and delivery of new services, and the like. Separated forwarding and control of wired broadband access network devices based on Software Defined Networking (SDN)/Network Function Virtualization (NFV) has become a consensus in the industry, and commercially deployed in some domestic and international markets. Further, related international and domestic standards organizations are actively promoting standardization thereof, to implement interconnection and interworking of the forwarding plane and the control plane of the access device.

In the industrial environment of insufficient public network addresses under Internet Protocol Version 4 (IPv4), the application of private network addresses, that is, carrier grade network address translation (CGN), is an effective transitional solution for solving the problem of insufficient IPv4 public network addresses. Specifically, for the CGN deployed in a wired broadband access network device of the carrier, with the forwarding and control separation of the wired broadband access network device, that is, separated deployment of the forwarding plane and the control plane, there is no effective solution yet for implementing CGN under the condition of separated forwarding and control.

SUMMARY

Embodiments of the present disclosure provide a method, an apparatus and a system for implementing carrier grade network address translation, an electronic device, and a computer-readable medium.

In a first aspect, an embodiment of the present disclosure provides a method for implementing carrier grade network address translation, including: transmitting a first request to a control plane of a forwarding and control separated broadband access system, where the first request is used for applying to the control plane for a public network address range; receiving a first response returned by the control plane, where the first response includes allocated public network address range information; receiving a public network address allocated to a user by the control plane according to the public network address range information; receiving a private network address allocated to the user by the control plane; and performing, according to the public network address and the private network address, public and private network address translation on received service traffic of the user.

In a second aspect, an embodiment of the present disclosure provides a method for implementing carrier grade network address translation, including: receiving a first request transmitted from a forwarding plane of a forwarding and control separated broadband access system, where the first request is used for applying for a public network address range; allocating public network address range information to the forwarding plane, and returning a first response to the forwarding plane, where the first response includes allocated public network address range information; allocating a public network address to a user according to the public network address range information, and transmitting the public network address to the forwarding plane; and allocating a private network address to the user, and transmitting the private network address to the forwarding plane.

In a third aspect, an embodiment of the present disclosure provides an electronic device, including: at least one processor; a memory having at least one program stored thereon which, when executed by the at least one processor, causes the at least one processor to implement any method for implementing carrier grade network address translation as described above.

In a fourth aspect, an embodiment of the present disclosure provides a computer-readable storage medium having a computer program stored thereon which, when executed by a processor, causes any method for implementing carrier grade network address translation as described above to be implemented.

In a fifth aspect, an embodiment of the present disclosure provides a system for implementing carrier grade network address translation, including a forwarding plane and a control plane; where the forwarding plane and the control plane are disposed in different electronic devices; the forwarding plane is configured to: transmit a first request to the control plane, where the first request is used for applying to the control plane for a public network address range; receive a first response returned by the control plane, where the first response includes allocated public network address range information; receive a public network address allocated to a user by the control plane according to the public network address range information; receive a private network address allocated to the user by the control plane; and perform, according to the public network address and the private network address, public and private network address translation on received service traffic of the user; and the control plane is configured to: receive the first request transmitted from the forwarding plane, allocate the public network address range information to the forwarding plane, and return the first response to the forwarding plane; allocate the public network address to the user according to the public network address range information, and transmit the public network address to the forwarding plane; and allocate the private network address to the user, and transmit the private network address to the forwarding plane.

BRIEF DESCRIPTION OF DRAWINGS

Accompanying drawings are provided for further understanding of the embodiments of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art through detailed description of the exemplary embodiments with reference to the accompanying drawings, in which.

DETAIL DESCRIPTION OF EMBODIMENTS

To improve understanding of the technical solutions of the present disclosure for those skilled in the art, the method, apparatus and system for implementing carrier grade network address translation, the electronic device, and the computer-readable storage medium of the present disclosure will be described below in detail in conjunction with the accompanying drawings.

Example embodiments will be described more sufficiently below with reference to the accompanying drawings, but which may be embodied in different forms and should not be construed as limited to the embodiments set forth herein. Rather, these embodiments are provided so that this disclosure will be thorough and complete, and will fully convey the scope of the present disclosure to those skilled in the art.

Embodiments of the present disclosure and features of the embodiments may be combined with each other without conflict.

As used in herein, the term "and/or" includes any and all combinations of at least one of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of at least one further feature, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

Figure 1:
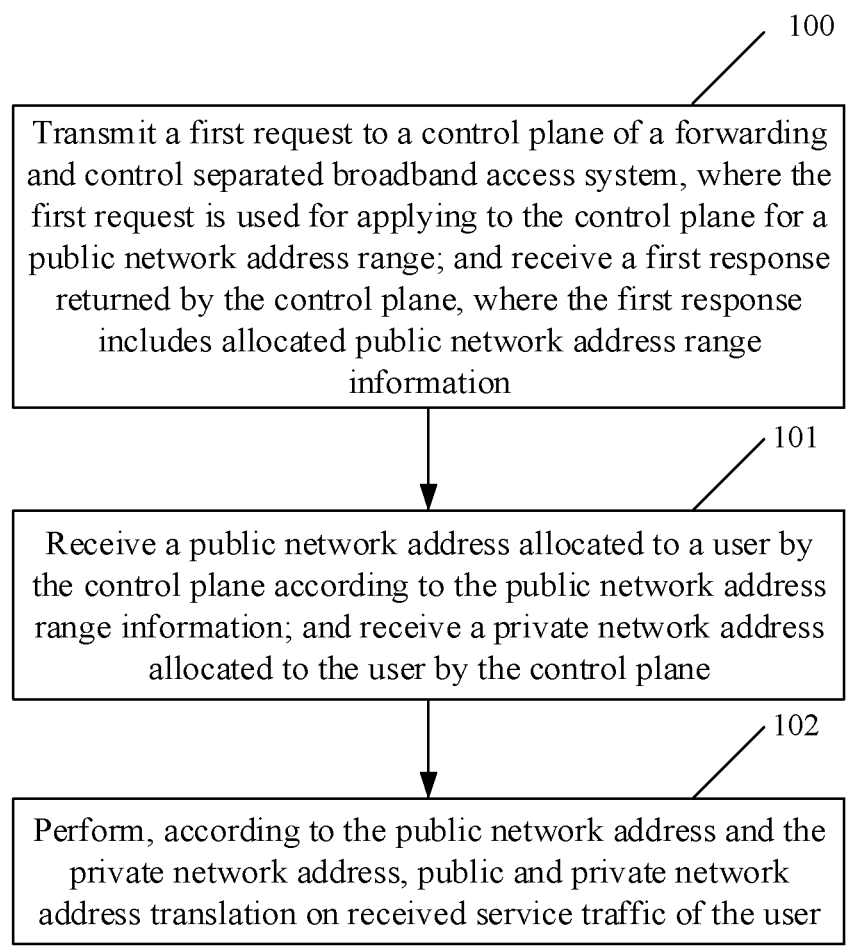
FIG. 1 is a flowchart of a method for implementing carrier grade network address translation according to the present disclosure.

FIG. 1 is a flowchart of a method for implementing carrier grade network address translation according to the present disclosure.

In a first aspect, referring to FIG. 1, the present disclosure provides a method for implementing carrier grade network address translation and applied to a forwarding plane of a forwarding and control separated broadband access system in which the forwarding plane and the control plane are disposed in different electronic devices. The method includes the following operations 100 to 102.

At operation 100, transmitting a first request to a control plane of a forwarding and control separated broadband access system, where the first request is used for applying to the control plane for a public network address range; and receiving a first response returned by the control plane, where the first response includes allocated public network address range information.

In present disclosure, the public network address range information may be a public network address range or an address mask.

In present disclosure, the first request may be a public network address range allocate request, and the first response may be a public network address range allocate response. Apparently, the first request and the first response are not limited to the names given above, as long as the names with the above functions are within the scope of the present disclosure, which are not described in detail here.

At operation 101, receiving a public network address allocated to a user by the control plane according to the public network address range information; and receiving a private network address allocated to the user by the control plane.

In present disclosure, the public network address may be a public network IPv4 address, and the private network address may be an IPv4 or IPv6 address.

At operation 102, performing, according to the public network address and the private network address, public and private network address translation on received service traffic of the user.

In present disclosure, the public and private network address translation may be a translation between an IPv4 address and a public network IPv4 address, namely NAT44; or may be a translation between an IPv6 address and a public network IPv4 address, namely NAT64.

In present disclosure, after receiving uplink service traffic, a private network address in a source address of the uplink service traffic is translated into a public network address; and after receiving downlink service traffic, a public network address in a destination address of the downlink service traffic is translated into a private network address.

In present disclosure, the method further includes: receiving a static port range allocated by the control plane to the user or a dynamic port allocated by the control plane for a specific service of the user; and forwarding, according to the port range or the port, the service traffic after the public and private network address translation.

In present disclosure, the method further includes: uploading user identity tracing information to the control plane; or uploading the user identity tracing information to a third-party legal monitoring system, where the user identity tracing information includes: the public network address, the private network address, and the port range; or the user identity tracing information includes: the public network address, the private network address, and the port.

In present disclosure, the method further includes: receiving a second request transmitted from the control plane, where the second request is used for querying a state of the public network address range; and returning a second response to the control plane, where the second response includes the state of the public network address range.

In present disclosure, the second request may be a public network address range state query request, and the second response may be a public network address range state query response. Apparently, the second request and the second response are not limited to the names given above, as long as the names with the above functions are within the scope of the present disclosure, which are not described in detail here.

In present disclosure, the public network address range is in an idle state, and the method further includes: transmitting a third request to the control plane, where the third request is used for requesting to release the public network address range.

In present disclosure, the third request may be a public network address range release request. Apparently, the third request is not limited to the name given above, as long as the name with the above function is within the scope of the present disclosure, which is not described in detail here.

In present disclosure, the method further includes: receiving a fourth request transmitted from the control plane, where the fourth request is used for querying a state of at least one public network address in the public network address range; and returning a fourth response to the control plane, where the fourth response includes the state of the at least one public network address in the public network address range.

In present disclosure, the fourth request may be a public network address state query request. Apparently, the fourth request is not limited to the name given above, as long as the name with the above function is within the scope of the present disclosure, which is not described in detail here.

In present disclosure, all public network addresses in the public network address range are in a used state, and the method further includes: re-transmitting the first request to the control plane.

In present disclosure, a usage right of the public network address range expires, and the method further includes: transmitting a fifth request to the control plane, where the fifth request is used for requesting to update the usage right of the public network address range.

In present disclosure, the fifth request may be a public network address range usage right update request. Apparently, the fifth request is not limited to the name given above, as long as the name with the above function is within the scope of the present disclosure, which is not described in detail here.

Figure 2:
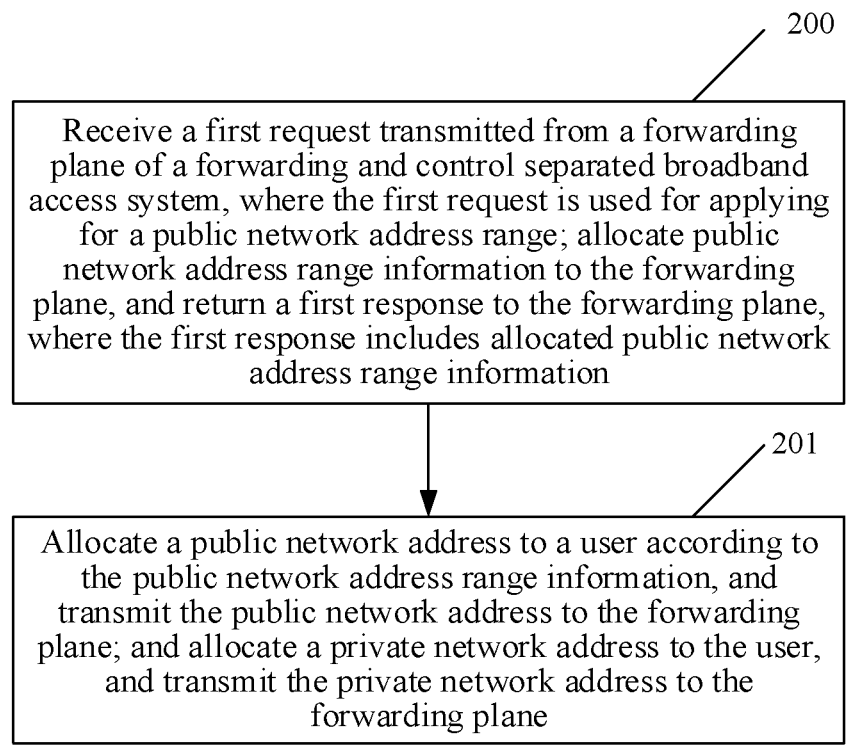
FIG. 2 is another flowchart of a method for implementing carrier grade network address translation according to the present disclosure.

FIG. 2 is another flowchart of a method for implementing carrier grade network address translation according to the present disclosure.

In a second aspect, referring to FIG. 2, the present disclosure provides another method for implementing carrier grade network address translation and applied to a control plane of a forwarding and control separated broadband access system in which the control plane and the forwarding plane are disposed in different electronic devices. The method includes the following operations 200 to 201.

At operation 200, receiving a first request transmitted from a forwarding plane of a forwarding and control separated broadband access system, where the first request is used for applying for a public network address range; allocating public network address range information to the forwarding plane, and returning a first response to the forwarding plane, where the first response includes allocated public network address range information.

In present disclosure, the public network address range information may be a public network address range or an address mask.

In present disclosure, the first request may be a public network address range allocate request, and the first response may be a public network address range allocate response. Apparently, the first request and the first response are not limited to the names given above, as long as the names with the above functions are within the scope of the present disclosure, which are not described in detail here.

At operation 201, allocating a public network address to a user according to the public network address range information, and transmitting the public network address to the forwarding plane; and allocating a private network address to the user, and transmitting the private network address to the forwarding plane.

In present disclosure, the public network address may be a public network IPv4 address, and the private network address may be an IPv4 or IPv6 address.

In present disclosure, the method further includes: allocating a static port range to the user, or allocating a dynamic port for a specific service of the user, and transmitting the port range or port to the forwarding plane.

In present disclosure, the method further includes: receiving user identity tracing information transmitted from the forwarding plane; and forwarding the user identity tracing information to an authentication authorization accounting system.

The user identity tracing information includes: the public network address, the private network address, and the port range; or the user identity tracing information includes: the public network address, the private network address, and the port.

In present disclosure, the method further includes: transmitting a second request to the forwarding plane, where the second request is used for querying a state of the public network address range; and receiving a second response returned by the forwarding plane, where the second response includes the state of the public network address range.

In present disclosure, the second request may be a public network address range state query request, and the second response may be a public network address range state query response. Apparently, the second request and the second response are not limited to the names given above, as long as the names with the above functions are within the scope of the present disclosure, which are not described in detail here.

In present disclosure, the public network address range is in an idle state, and the method further includes: receiving a third request transmitted from the forwarding plane, where the third request is used for requesting to release the public network address range; and releasing the public network address range.

In present disclosure, the third request may be a public network address range release request. Apparently, the third request is not limited to the name given above, as long as the name with the above function is within the scope of the present disclosure, which is not described in detail here.

In present disclosure, the method further includes: transmitting a fourth request to the forwarding plane, where the fourth request is used for querying a state of at least one public network address in the public network address range; and receiving a fourth response returned by the forwarding plane, where the fourth response includes the state of the at least one public network address in the public network address range.

In present disclosure, the fourth request may be a public network address state query request. Apparently, the fourth request is not limited to the name given above, as long as the name with the above function is within the scope of the present disclosure, which is not described in detail here.

In present disclosure, a usage right of the public network address range expires, and the method further includes: receiving a fifth request transmitted from the forwarding plane, where the fifth request is used for requesting to update the usage right of the public network address range.

In present disclosure, the fifth request may be a public network address range usage right update request. Apparently, the fifth request is not limited to the name given above, as long as the name with the above function is within the scope of the present disclosure, which is not described in detail here.

In present disclosure, the first request, the first response, the second request, the second response, the third request, the fourth request, and the fifth request may be transmitted and received via a control interface channel between the forwarding plane and the control plane.

In a third aspect, the present disclosure provides an electronic device, including: at least one processor; and a memory having at least one program stored thereon which, when executed by the at least one processor, causes the at least one processor to implement any method for implementing carrier grade network address translation as described above.

The processor is a device with a data processing capability, including but not limited to a central processing unit (CPU) or the like; and the memory is a device with a data storage capability, including but not limited to a random access memory (RAM, more specifically SDRAM, DDR, etc.), a read only memory (ROM), an electrically erasable programmable read only memory (EEPROM) or a flash memory (FLASH).

In present disclosure, the processor and the memory are interconnected via bus, and thus connected to other components of the electronic device.

In a fourth aspect, the present disclosure provides a computer-readable storage medium having a computer program stored thereon which, when executed by a processor, causes any method for implementing carrier grade network address translation as described above to be implemented.

The following describes specific implementations of the embodiments of the present disclosure in conjunction with specific examples, but the examples listed are merely for convenience of description and do not intend to limit the scope of the present disclosure.

Example 1

Figure 3:
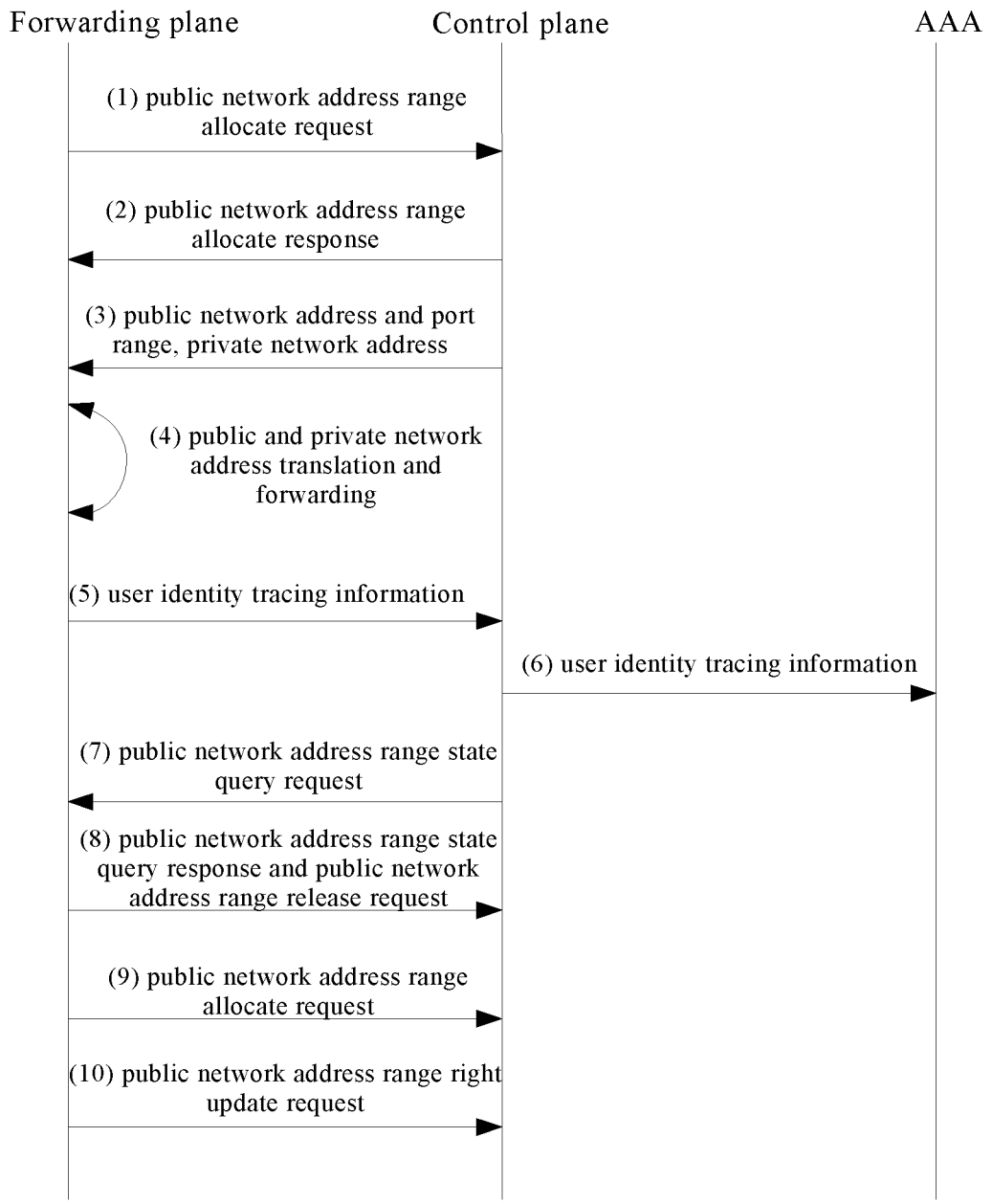
FIG. 3 is a flowchart of a method for implementing carrier grade network address translation provided in Example 1 according to the present disclosure.

Referring to FIG. 3, the method includes the following process.

(1) (non-user flow) A forwarding plane of a broadband access system (vBRAS or DBNG) transmits a public network address range allocate request to a control plane via a control interface channel between the forwarding plane and the control plane, where the public network address range allocate request is used for applying to the control plane for a public network address range (or address mask).

(2) (non-user flow) The control plane of the broadband access system (vBRAS or DBNG) allocates a public network address range (or address mask) to the forwarding plane, and delivers, via the control interface channel between the forwarding plane and the control plane, a public network address range allocate response containing the public network address range (or address mask) to the forwarding plane.

(3) (user flow) The control plane of the broadband access system (vBRAS or DBNG) allocates a public network address and port range to a user, and delivers the public network address and port range to the forwarding plane via the control interface channel between the forwarding plane and the control plane, while the user uses the public network address and port range statically within a specified service cycle, and performs service access; and the control plane allocates a private network address to the user, and delivers the private network address to the forwarding plane via the control interface channel between the forwarding plane and the control plane.

(4) (user flow) The forwarding plane of the broadband access system (vBRAS or DBNG) performs public and private network address translation on and forwards uplink and downlink service traffic of the user.

(5) (user flow) The forwarding plane of the broadband access system (vBRAS or DBNG) uploads user identity tracing information to the control plane (the user identity tracing information includes, but is not limited to, the public network address, the private network address, and the port range).

(6) (user flow) The control plane of the broadband access system (vBRAS or DBNG) forwards the user identity tracing information received in (5) to an authentication authorization accounting (AAA) system (the user identity tracing information includes, but is not limited to, the public network address, the private network address, and the port range).

(7) (non-user flow) The control plane of the broadband access system (vBRAS or DBNG) transmits a public network address range state query request to the forwarding plane via the control interface channel between the forwarding plane and the control plane (the public network address range may be in an idle or used state).

(8) (non-user flow) The forwarding plane of the broadband access system (vBRAS or DBNG) detects the state of the public network address range queried by the control plane in (7), and transmits a public network address range state query response to the control plane via the control interface channel between the forwarding plane and the control plane, where the public network address range state query response includes the state of the public network address range, and if the public network address range is in the idle state, a public network address range release request is initiated at the same time.

(9) (non-user flow) If all public network addresses in the public network address range applied for by the forwarding plane of the broadband access system (vBRAS or DBNG) are in the used state, the public network address range allocate request is re-initiated to the control plane via the control interface channel between the forwarding plane and the control plane, to apply to the control plane for a new public network address range.

(10) (non-user flow) If a usage right of a public network address in the public network address range applied for by the forwarding plane of the broadband access system (vBRAS or DBNG) expires, a public network address range usage right update request is initiated to the control plane via the control interface channel between the forwarding plane and the control plane.

Example 2

Figure 4:
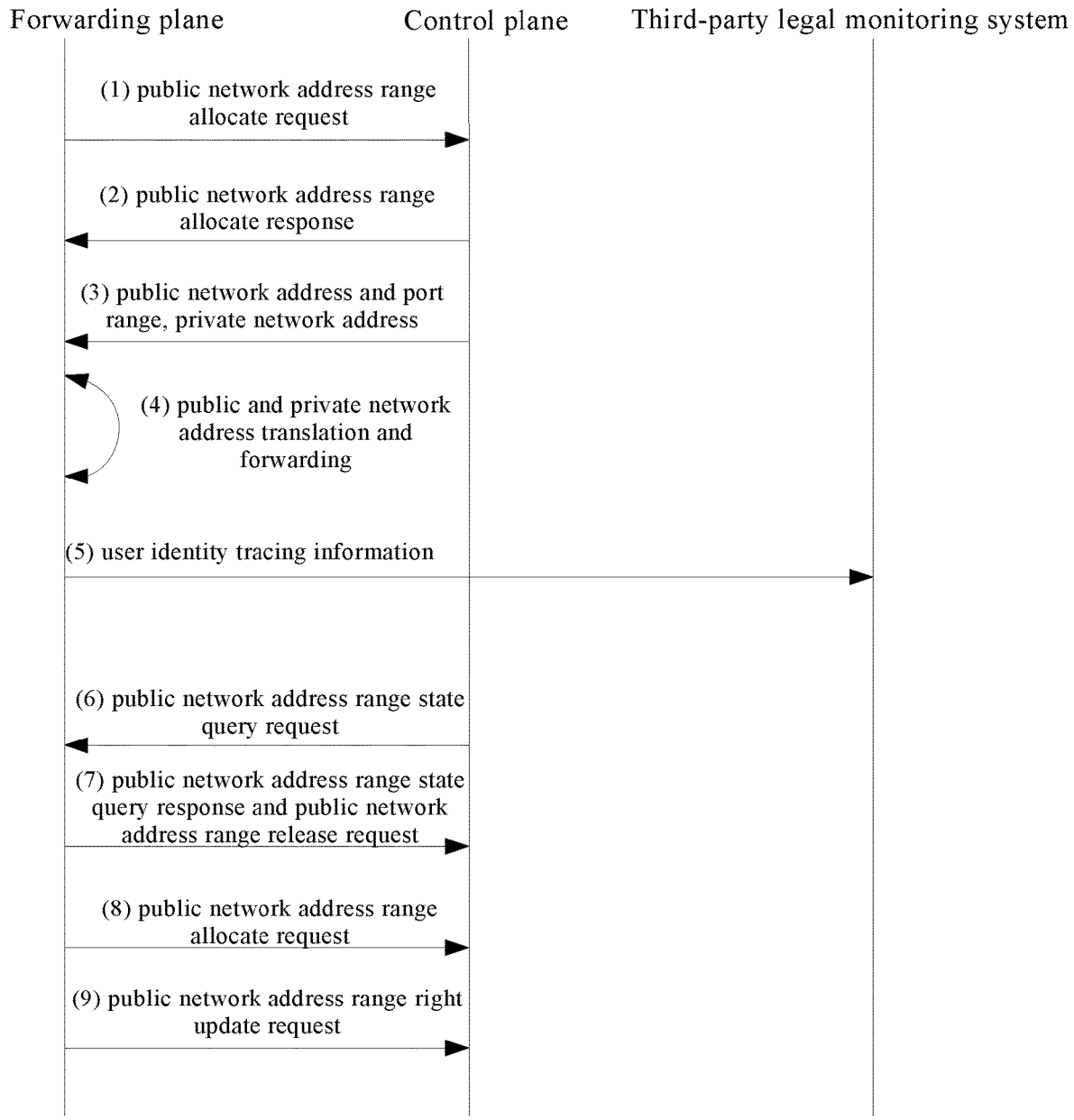
FIG. 4 is a flowchart of a method for implementing carrier grade network address translation provided in Example 2 according to the present disclosure.

Referring to FIG. 4, the method includes the following process.

(1) (non-user flow) A forwarding plane of a broadband access system (vBRAS or DBNG) transmits a public network address range allocate request to a control plane via a control interface channel between the forwarding plane and the control plane, where the public network address range allocate request is used for applying to the control plane for a public network address range (or address mask).

(2) (non-user flow) The control plane of the broadband access system (vBRAS or DBNG) allocates a public network address range (or address mask) to the forwarding plane, and delivers, via the control interface channel between the forwarding plane and the control plane, a public network address range allocate response containing the public network address range (or address mask) to the forwarding plane.

(3) (user flow) The control plane of the broadband access system (vBRAS or DBNG) allocates a public network address and port range to a user, and delivers the public network address and port range to the forwarding plane via the control interface channel between the forwarding plane and the control plane, while the user uses the public network address and port range statically within a specified service cycle, and performs service access; and the control plane allocates a private network address to the user, and delivers the private network address to the forwarding plane via the control interface channel between the forwarding plane and the control plane.

(4) (user flow) The forwarding plane of the broadband access system (vBRAS or DBNG) performs public and private network address translation on and forwards uplink and downlink service traffic of the user.

(5) (user flow) The forwarding plane of the broadband access system (vBRAS or DBNG) uploads user identity tracing information to a third-party legal monitoring system (the user identity tracing information includes, but is not limited to, the public network address, the private network address, and the port range).

(6) (non-user flow) The control plane of the broadband access system (vBRAS or DBNG) transmits a public network address range state query request to the forwarding plane via the control interface channel between the forwarding plane and the control plane (the public network address range may be in an idle or used state).

(7) (non-user flow) The forwarding plane of the broadband access system (vBRAS or DBNG) detects the state of the public network address range queried by the control plane in (6), and transmits a public network address range state query response to the control plane via the control interface channel between the forwarding plane and the control plane, where the public network address range state query response includes the state of the public network address range, and if the public network address range is in the idle state, a public network address range release request is initiated at the same time.

(8) (non-user flow) If all public network addresses in the public network address range applied for by the forwarding plane of the broadband access system (vBRAS or DBNG) are in the used state, the public network address range allocate request is re-initiated to the control plane via the control interface channel between the forwarding plane and the control plane, to apply to the control plane for a new public network address range.

(9) (non-user flow) If a usage right of a public network address in the public network address range applied for by the forwarding plane of the broadband access system (vBRAS or DBNG) expires, a public network address range usage right update request is initiated to the control plane via the control interface channel between the forwarding plane and the control plane.

Example 3

Figure 5:
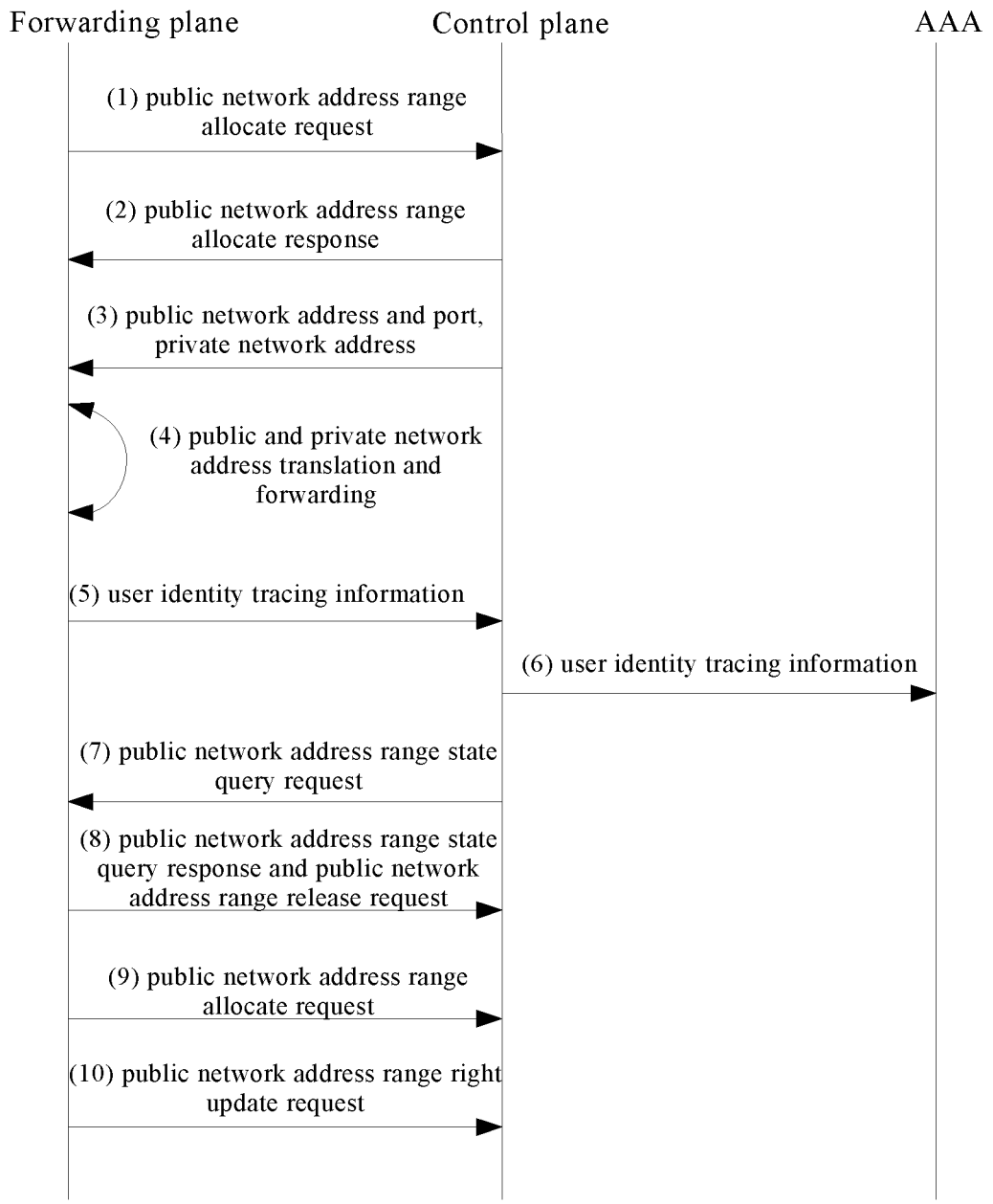
FIG. 5 is a flowchart of a method for implementing carrier grade network address translation provided in Example 3 according to the present disclosure.

Referring to FIG. 5, the method includes the following process.

(1) (non-user flow) A forwarding plane of a broadband access system (vBRAS or DBNG) transmits a public network address range allocate request to a control plane via a control interface channel between the forwarding plane and the control plane, where the public network address range allocate request is used for applying to the control plane for a public network address range (or address mask).

(2) (non-user flow) The control plane of the broadband access system (vBRAS or DBNG) allocates a public network address range (or address mask) to the forwarding plane, and delivers, via the control interface channel between the forwarding plane and the control plane, a public network address range allocate response containing the public network address range (or address mask) to the forwarding plane.

(3) (user flow) The control plane of the broadband access system (vBRAS or DBNG) allocates a public network address and port to a user, and delivers the public network address and port to the forwarding plane via the control interface channel between the forwarding plane and the control plane, while the user uses the public network address and port dynamically for service access; and the control plane allocates a private network address to the user, and delivers the private network address to the forwarding plane via the control interface channel between the forwarding plane and the control plane.

(4) (user flow) The forwarding plane of the broadband access system (vBRAS or DBNG) performs public and private network address translation on and forwards uplink and downlink service traffic of the user.

(5) (user flow) The forwarding plane of the broadband access system (vBRAS or DBNG) uploads user identity tracing information to the control plane (the user identity tracing information includes, but is not limited to, the public network address, the private network address, and the port).

(6) (user flow) The control plane of the broadband access system (vBRAS or DBNG) forwards the user identity tracing information received in (5) to an AAA system (the user identity tracing information includes, but is not limited to, the public network address, the private network address, and the port).

(7) (non-user flow) The control plane of the broadband access system (vBRAS or DBNG) transmits a public network address range state query request to the forwarding plane via the control interface channel between the forwarding plane and the control plane (the public network address range may be in an idle or used state).

(8) (non-user flow) The forwarding plane of the broadband access system (vBRAS or DBNG) detects the state of the public network address range queried by the control plane in (7), and transmits a public network address range state query response to the control plane via the control interface channel between the forwarding plane and the control plane, where the public network address range state query response includes the state of the public network address range, and if the public network address range is in the idle state, a public network address range release request is initiated at the same time.

(9) (non-user flow) If all public network addresses in the public network address range applied for by the forwarding plane of the broadband access system (vBRAS or DBNG) are in the used state, the public network address range allocate request is re-initiated to the control plane via the control interface channel between the forwarding plane and the control plane, to apply to the control plane for a new public network address range.

(10) (non-user flow) If a usage right of a public network address in the public network address range applied for by the forwarding plane of the broadband access system (vBRAS or DBNG) expires, a public network address range usage right update request is initiated to the control plane via the control interface channel between the forwarding plane and the control plane.

Example 4

Figure 6:
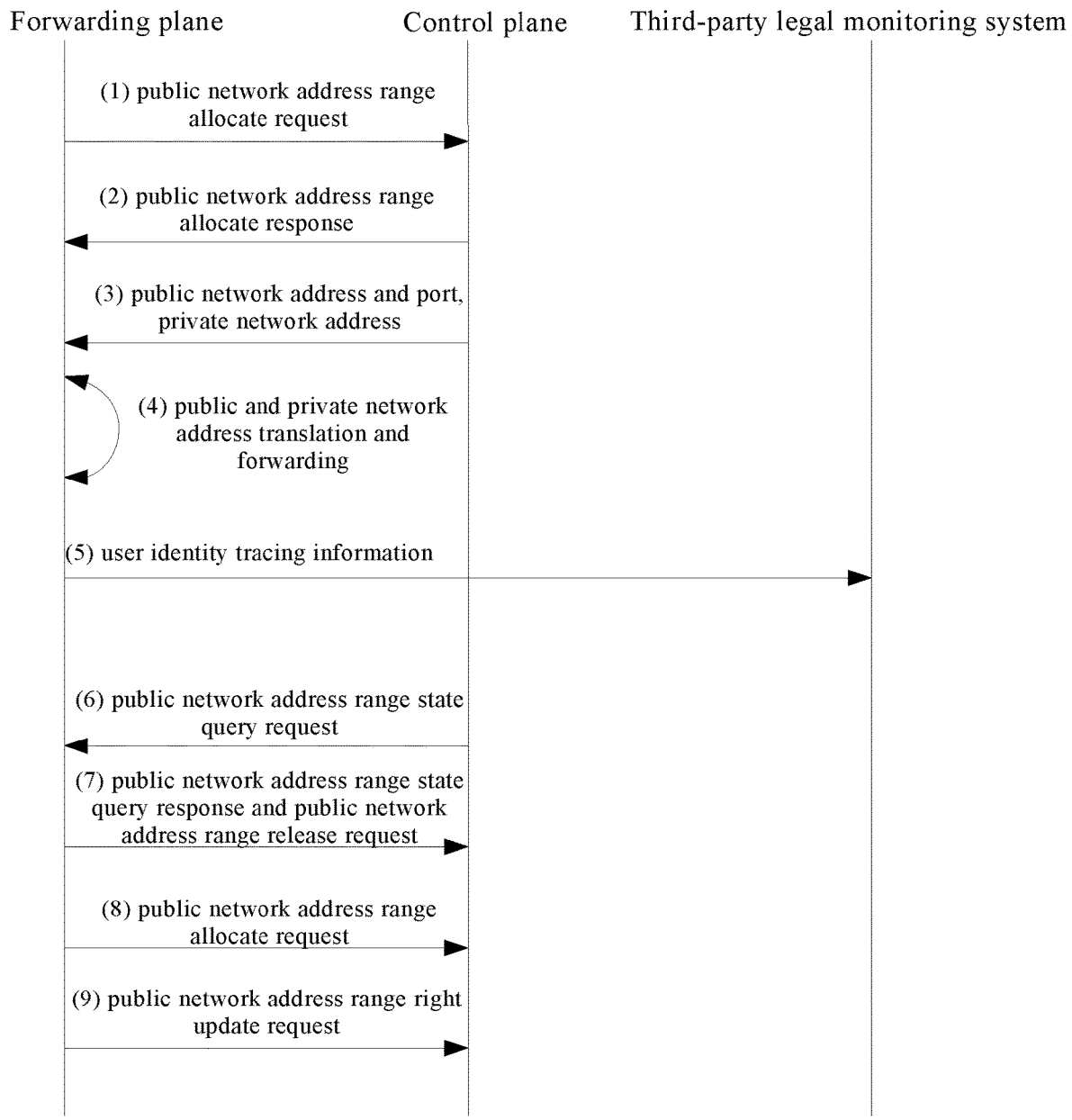
FIG. 6 is a flowchart of a method for implementing carrier grade network address translation provided in Example 4 according to the present disclosure.

Referring to FIG. 6, the method includes the following process.

(1) (non-user flow) A forwarding plane of a broadband access system (vBRAS or DBNG) transmits a public network address range allocate request to a control plane via a control interface channel between the forwarding plane and the control plane, where the public network address range allocate request is used for applying to the control plane for a public network address range (or address mask).

(2) (non-user flow) The control plane of the broadband access system (vBRAS or DBNG) allocates a public network address range (or address mask) to the forwarding plane, and delivers, via the control interface channel between the forwarding plane and the control plane, a public network address range allocate response containing the public network address range (or address mask) to the forwarding plane.

(3) (user flow) The control plane of the broadband access system (vBRAS or DBNG) allocates a public network address and port to a user, and delivers the public network address and port to the forwarding plane via the control interface channel between the forwarding plane and the control plane, while the user uses the public network address and port dynamically for service access; and the control plane allocates a private network address to the user, and delivers the private network address to the forwarding plane via the control interface channel between the forwarding plane and the control plane.

(4) (user flow) The forwarding plane of the broadband access system (vBRAS or DBNG) performs public and private network address translation on and forwards uplink and downlink service traffic of the user.

(5) (user flow) The forwarding plane of the broadband access system (vBRAS or DBNG) uploads user identity tracing information to a third-party legal monitoring system (the user identity tracing information includes, but is not limited to, the public network address, the private network address, and the port).

(6) (non-user flow) The control plane of the broadband access system (vBRAS or DBNG) transmits a public network address range state query request to the forwarding plane via the control interface channel between the forwarding plane and the control plane (the public network address range may be in an idle or used state).

(7) (non-user flow) The forwarding plane of the broadband access system (vBRAS or DBNG) detects the state of the public network address range queried by the control plane in (6), and transmits a public network address range state query response to the control plane via the control interface channel between the forwarding plane and the control plane, where the public network address range state query response includes the state of the public network address range, and if the public network address range is in the idle state, a public network address range release request is initiated at the same time.

(8) (non-user flow) If all public network addresses in the public network address range applied for by the forwarding plane of the broadband access system (vBRAS or DBNG) are in the used state, the public network address range allocate request is re-initiated to the control plane via the control interface channel between the forwarding plane and the control plane, to apply to the control plane for a new public network address range.

(9) (non-user flow) If a usage right of a public network address in the public network address range applied for by the forwarding plane of the broadband access system (vBRAS or DBNG) expires, a public network address range usage right update request is initiated to the control plane via the control interface channel between the forwarding plane and the control plane.

Figure 7:
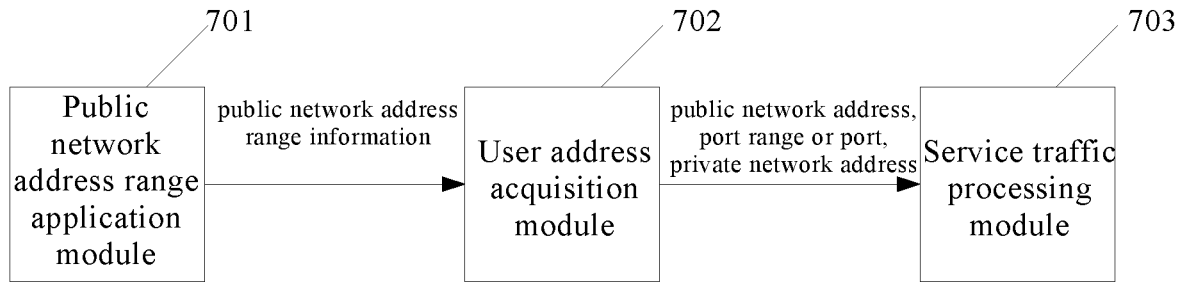
FIG. 7 is a block diagram of an apparatus for implementing carrier grade network address translation according to the present disclosure.

FIG. 7 is a block diagram of an apparatus for implementing carrier grade network address translation according to the present disclosure.

In a fifth aspect, referring to FIG. 7, the present disclosure provides an apparatus for implementing carrier grade network address translation, including: a public network address range application module 701 configured to transmit a first request to a control plane of a forwarding and control separated broadband access system, where the first request is used for applying to the control plane for a public network address range, and receive a first response returned by the control plane, where the first response includes allocated public network address range information; a user address acquisition module 702 configured to receive a public network address allocated to a user by the control plane according to the public network address range information, and receive a private network address allocated to the user by the control plane; and a service traffic processing module 703 configured to perform, according to the public network address and the private network address, public and private network address translation on received service traffic of the user.

In present disclosure, the public network address range information includes: a public network address range or an address mask.

In present disclosure, the user address acquisition module 702 is further configured to: receive a static port range allocated by the control plane to the user or a dynamic port allocated by the control plane for a specific service of the user; and the service traffic processing module 703 is further configured to: forward, according to the port range or the port, the service traffic after the public and private network address translation.

In present disclosure, the user address acquisition module 702 is further configured to: upload user identity tracing information to the control plane; or upload the user identity tracing information to a third-party legal monitoring system.

The user identity tracing information includes: the public network address, the private network address, and the port range; or the user identity tracing information includes: the public network address, the private network address, and the port.

In present disclosure, the public network address range application module 701 is further configured to: receive a second request transmitted from the control plane, where the second request is used for querying a state of the public network address range; and return a second response to the control plane, where the second response includes the state of the public network address range.

In present disclosure, the public network address range is in an idle state, and the public network address range application module 701 is further configured to: transmit a third request to the control plane, where the third request is used for requesting to release the public network address range.

In present disclosure, the public network address range application module 701 is further configured to: receive a fourth request transmitted from the control plane, where the fourth request is used for querying a state of at least one public network address in the public network address range; and return a fourth response to the control plane, where the fourth response includes the state of the at least one public network address in the public network address range.

In present disclosure, all public network addresses in the public network address range are in a used state, and the public network address range application module 701 is further configured to: re-transmit the first request to the control plane.

In present disclosure, a usage right of the public network address range expires, and the public network address range application module 701 is further configured to: transmit a fifth request to the control plane, where the fifth request is used for requesting to update the usage right of the public network address range.

The specific implementation process of the apparatus for implementing carrier grade network address translation is the same as the specific implementation process of the method for implementing carrier grade network address translation described in the foregoing embodiments, and thus is not repeated here.

Figure 8:
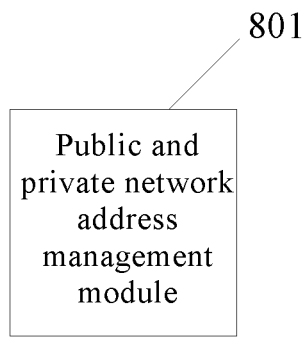
FIG. 8 is another block diagram of an apparatus for implementing carrier grade network address translation according to the present disclosure.

FIG. 8 is another block diagram of an apparatus for implementing carrier grade network address translation according to the present disclosure.

In a sixth aspect, referring to FIG. 8, the present disclosure provides another apparatus for implementing carrier grade network address translation, including: a public and private network address management module 801 configured to receive a first request transmitted from a forwarding plane of a forwarding and control separated broadband access system, where the first request is used for applying for a public network address range; allocate public network address range information to the forwarding plane, and return a first response to the forwarding plane, where the first response includes allocated public network address range information; allocate a public network address to the user according to the public network address range information, and transmit the public network address to the forwarding plane; and allocate a private network address to the user, and transmit the private network address to the forwarding plane.

In present disclosure, the public network address range information includes: a public network address range or an address mask.

In present disclosure, the public and private network address management module 801 is further configured to: allocate a static port range to the user, or allocate a dynamic port for a specific service of the user, and transmit the port range or port to the forwarding plane.

In present disclosure, the public and private network address management module 801 is further configured to: receive user identity tracing information transmitted from the forwarding plane; and forward the user identity tracing information to an authentication authorization accounting system.

The user identity tracing information includes: the public network address, the private network address, and the port range; or the user identity tracing information includes: the public network address, the private network address, and the port.

In present disclosure, the public and private network address management module 801 is further configured to: transmit a second request to the forwarding plane, where the second request is used for querying a state of the public network address range; and receive a second response returned by the forwarding plane, where the second response includes the state of the public network address range.

In present disclosure, the public network address range is in an idle state, and the public and private network address management module 801 is further configured to: receive a third request transmitted from the forwarding plane, where the third request is used for requesting to release the public network address range; and release the public network address range.

In present disclosure, the public and private network address management module 801 is further configured to: transmit a fourth request to the forwarding plane, where the fourth request is used for querying a state of at least one public network address in the public network address range; and receive a fourth response returned by the forwarding plane, where the fourth response includes the state of the at least one public network address in the public network address range.

In present disclosure, a usage right of the public network address range expires, and the public and private network address management module 801 is further configured to: receive a fifth request transmitted from the forwarding plane, where the fifth request is used for requesting to update the usage right of the public network address range.

The specific implementation process of the apparatus for implementing carrier grade network address translation is the same as the specific implementation process of the method for implementing carrier grade network address translation described in the foregoing embodiments, and thus is not repeated here.

Figure 9:
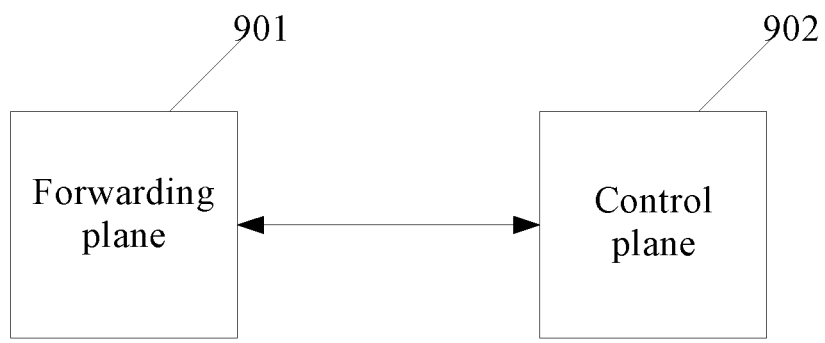
FIG. 9 is a block diagram of a system for implementing carrier grade network address translation according to the present disclosure.

FIG. 9 is a block diagram of a system for implementing carrier grade network address translation according to the present disclosure.

In a seventh aspect, referring to FIG. 9, the present disclosure provides a system for implementing carrier grade network address translation, including: a forwarding plane 901 and a control plane 902.

The forwarding plane 901 and the control plane 902 are disposed in different electronic devices.

The forwarding plane 901 is configured to: transmit a first request to the control plane, where the first request is used for applying to the control plane for a public network address range; receive a first response returned by the control plane; where the first response includes allocated public network address range information; receive a public network address allocated to a user by the control plane according to the public network address range information; receive a private network address allocated to the user by the control plane; and perform, according to the public network address and the private network address, public and private network address translation on received service traffic of the user.

The control plane 902 is configured to: receive the first request transmitted from the forwarding plane, allocate the public network address range information to the forwarding plane, and return the first response to the forwarding plane; allocate the public network address to the user according to the public network address range information, and transmit the public network address to the forwarding plane; and allocate the private network address to the user, and transmit the private network address to the forwarding plane.

In present disclosure, the public network address range information includes: a public network address range or an address mask.

In present disclosure, the forwarding plane 901 is further configured to: receive a static port range allocated by the control plane to the user or a dynamic port allocated by the control plane for a specific service of the user; and forward, according to the port range or the port, the service traffic after the public and private network address translation.

The control plane 902 is further configured to: allocate the static port range to the user, or allocate the dynamic port for the specific service of the user, and transmit the port range or port to the forwarding plane.

In present disclosure, the forwarding plane 901 is further configured to: upload user identity tracing information to the control plane; or upload the user identity tracing information to a third-party legal monitoring system.

The control plane 902 is further configured to: receive the user identity tracing information transmitted from the forwarding plane; and forward the user identity tracing information to an authentication authorization accounting system.

The user identity tracing information includes: the public network address, the private network address, and the port range; or the user identity tracing information includes: the public network address, the private network address, and the port.

In present disclosure, the forwarding plane 901 is further configured to: receive a second request transmitted from the control plane, where the second request is used for querying a state of the public network address range; and return a second response to the control plane, where the second response includes the state of the public network address range.

The control plane 902 is further configured to: transmit the second request to the forwarding plane, and receive the second response returned by the forwarding plane.

In present disclosure, the public network address range is in an idle state, and the forwarding plane 901 is further configured to: transmit a third request to the control plane, where the third request is used for requesting to release the public network address range; and the control plane 902 is further configured to: receive the third request transmitted from the forwarding plane.

In present disclosure, the forwarding plane 901 is further configured to: receive a fourth request transmitted from the control plane, where the fourth request is used for querying a state of at least one public network address in the public network address range; and return a fourth response to the control plane, where the fourth response includes the state of the at least one public network address in the public network address range.

The control plane 902 is further configured to: transmit the fourth request to the forwarding plane, and receive the fourth response returned by the forwarding plane.

In present disclosure, all public network addresses in the public network address range are in a used state, and the forwarding plane 901 is further configured to: re-transmit the first request to the control plane.

In present disclosure, a usage right of the public network address range expires, and the forwarding plane 901 is further configured to: transmit a fifth request to the control plane, where the fifth request is used for requesting to update the usage right of the public network address range; and the control plane 902 is further configured to: receiving the fifth request transmitted from the forwarding plane.

In the embodiments of the present disclosure, the control plane may be deployed in a centralized manner, and responsible for centralized management of users and addresses; while the forwarding plane may be deployed in a distributed manner and close to the user, and perform uplink and downlink forwarding of user service traffic nearby.

The specific implementation process of the system for implementing carrier grade network address translation is the same as the specific implementation process of the method for implementing carrier grade network address translation described in the foregoing embodiments, and thus is not repeated here.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to one of ordinary skill in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

INDUSTRIAL APPLICABILITY

With the method for implementing carrier grade network address translation in the embodiments of the present disclosure, the CGN in a forwarding and control separated broadband access system (e.g., a forwarding and control separated virtual broadband remote access server (vBRAS) or disaggregated broadband network gateway (DBNG)) is implemented.

What is claimed is:

1. A method for implementing carrier grade network address translation, comprising:
   transmitting a first request to a control plane of a forwarding and control separated broadband access system, wherein the first request is used for applying to the control plane for a public network address range;
   receiving a first response returned by the control plane, wherein the first response comprises allocated public network address range information;
   receiving a public network address allocated to a user by the control plane according to the public network address range information; receiving a private network address allocated to the user by the control plane;
   performing, according to the public network address and the private network address, public and private network address translation on received service traffic of the user;
   receiving a second request transmitted from the control plane, wherein the second request is used for querying a state of the public network address range; and
   returning a second response to the control plane, wherein the second response comprises the state of the public network address range.

2. The method according to claim 1, wherein the public network address range is in an idle state, and the method further comprises:
   transmitting a third request to the control plane, wherein the third request is used for requesting to release the public network address range.

3. The method according to claim 1, further comprising:
   receiving a fourth request transmitted from the control plane, wherein the fourth request is used for querying a state of at least one public network address in the public network address range; and
   returning a fourth response to the control plane, wherein the fourth response comprises the state of the at least one public network address in the public network address range.

4. The method according to claim 1, wherein all public network addresses in the public network address range are in a used state, and the method further comprises: re-transmitting the first request to the control plane.

5. The method according to claim 1, wherein a usage right of the public network address range expires, and the method further comprises:
   transmitting a fifth request to the control plane, wherein the fifth request is used for requesting to update the usage right of the public network address range.

6. A non-transitory computer-readable storage medium having a computer program stored thereon, the computer program, when executed by a processor, causes the processor to implement the method for implementing carrier grade network address translation according to claim 1.

7. The method according to claim 1, further comprising:
   receiving a static port range allocated by the control plane to the user or a dynamic port allocated by the control plane for a specific service of the user; and
   forwarding, according to the port range or the port, the service traffic after the public and private network address translation.

8. The method according to claim 7, further comprising:
   uploading user identity tracing information to the control plane;
   or uploading the user identity tracing information to a third-party legal monitoring system;
   wherein the user identity tracing information comprises: the public network address, the private network address, and the port range; or the user identity tracing information comprises: the public network address, the private network address, and the port.

9. A method for implementing carrier grade network address translation, comprising:
   receiving a first request transmitted from a forwarding plane of a forwarding and control separated broadband access system, wherein the first request is used for applying for a public network address range; allocating public network address range information to the forwarding plane, and returning a first response to the forwarding plane, wherein the first response comprises allocated public network address range information;
   allocating a public network address to a user according to the public network address range information, and transmitting the public network address to the forwarding plane; and allocating a private network address to the user, and transmitting the private network address to the forwarding plane;
   transmitting a second request to the forwarding plane, wherein the second request is used for querying a state of the public network address range; and
   receiving a second response returned by the forwarding plane, wherein the second response comprises the state of the public network address range.

10. The method according to claim 9, wherein the public network address range is in an idle state, and the method further comprises:

receiving a third request transmitted from the forwarding plane, wherein the third request is used for requesting to release the public network address range; and releasing the public network address range.

11. The method according to claim 9, further comprising:
transmitting a fourth request to the forwarding plane, wherein the fourth request is used for querying a state of at least one public network address in the public network address range; and
receiving a fourth response returned by the forwarding plane, wherein the fourth response comprises the state of the at least one public network address in the public network address range.

12. The method according to claim 9, wherein a usage right of the public network address range expires, and the method further comprises:
receiving a fifth request transmitted from the forwarding plane, wherein the fifth request is used for requesting to update the usage right of the public network address range.

13. A non-transitory computer-readable storage medium having a computer program stored thereon, the computer program, when executed by a processor, causes the processor to implement the method for implementing carrier grade network address translation according to claim 9.

14. The method according to claim 9, further comprising:
allocating a static port range to the user, or allocating a dynamic port for a specific service of the user, and transmitting the port range or port to the forwarding plane.

15. The method according to claim 14, further comprising:
receiving user identity tracing information transmitted from the forwarding plane; and
forwarding the user identity tracing information to an authentication authorization accounting system,
wherein the user identity tracing information comprises: the public network address, the private network address, and the port range; or the user identity tracing information comprises: the public network address, the private network address, and the port.

16. A system for implementing carrier grade network address translation, comprising a forwarding plane and a control plane;
wherein the forwarding plane and the control plane are disposed in different electronic devices;
the forwarding plane is configured to:
transmit a first request to the control plane, wherein the first request is used for applying to the control plane for a public network address range; receive a first response returned by the control plane, wherein the first response comprises allocated public network address range information; receive a public network address allocated to a user by the control plane according to the public network address range; receive a private network address allocated to the user by the control plane; perform, according to the public network address and the private network address, public and private network address translation on received service traffic of the user; receive a second request transmitted from the control plane, wherein the second request is used for querying a state of the public network address range; and return a second response to the control plane, wherein the second response comprises the state of the public network address range; and
the control plane is configured to:
receive the first request transmitted from the forwarding plane, allocate the public network address range information to the forwarding plane, and return the first response to the forwarding plane; allocate the public network address to the user according to the public network address range information, and transmit the public network address to the forwarding plane; allocate the private network address to the user, and transmit the private network address to the forwarding plane; transmit a second request to the forwarding plane, wherein the second request is used for querying a state of the public network address range; and receive a second response returned by the forwarding plane, wherein the second response comprises the state of the public network address range.

* * * * *